Patented May 28, 1946

2,401,095

UNITED STATES PATENT OFFICE 2,401,095

DISTILLATION PRODUCTS OF ACYLATED SHELL LIQUIDS AND METHODS OF MAKING SAME

Emil E. Novotny, North Wales, and George K. Vogelsang, La Montt, Pa., assignors to Durite Plastics, Incorporated, Philadelphia, Pa., a corporation of Pennsylvania No Drawing. Application May 2, 1941, Serial No. 391,552

4 Claims. (Cl. 260—479)

This invention concerns itself with the distillation products of acylated shell liquid of the cashew nut (Anacardium occidentale) and of related botanical species such as the marking nut (Anacardium orientale or Semecarpus anacardium), and with methods for producing said products.

In the following description and claims, the distillation products of the acylated shell liquids will be referred to as "distilled acylated shell liquids." The distilled acylated shell liquids, as far as we have been able to ascertain, have never been prepared prior to our invention. As will be pointed out in greater detail as the description proceeds, these products constitute a distinctively new and unique class of materials possessing hitherto unsuspected properties in the way of physical characteristics, chemical reactivity and compatibility with many diverse materials. This unusual combination of properties renders the distilled acylated shell liquids suitable for a large number of industrial applications.

As an indication of their wide range of usefulness in the industries, it may be be stated that the distilled acylated shell liquids or their detoxicated products may be used as high boiling solvents and plasticizers in various commercial products such as coating compositions, lacquers, enamels and varnishes, as common solvents or coupling agents for many diverse materials which would otherwise be incompatible, as dispersing agents for the preparation of emulsions and colloidal suspensions, as impregnating agents for porous materials such as paper, fabric, wood, etc., as ingredients in insecticidal, germicidal and fungicidal compositions, as intermediates in the manufacture of synthetic drying oils, gums, rubbers and resins, high temperature baking varnishes, oil-soluble resins, and as modifying agents in compositions containing natural or synthetic gums, rubbers or resins. The products of the invention may also be used in making automobile cleaner and polish, waterproof sandpaper and cloth, typewriter stencil sheets, coating for carbon papers to prevent smudging, paint and varnish remover, abrasive wheels, friction elements such as brake blocks and linings, etc. In applying the distilled acylated shell liquids to their many possible industrial uses, these materials may be chemically modified in various ways as by hydrogenation, oxidation, chlorination, condensation, polymerization and reaction with other materials as will be more specifically pointed out as the description proceeds.

It may be noted at this point that the distilled acylated shell liquids are more or less toxic in that they have a tendency to produce dermatitis in persons allergic to the shell liquids. However, the distilled acylated products may be readily desensitized in substantially the same manner as the shell liquids themselves, and furthermore these products automatically become desensitized in most reactions involving condensation or polymerization, thereby eliminating a very serious industrial hazard.

Briefly stated, the process of the present invention consists in reacting the shell liquid of the cashew or marking nut with an acylating agent, and then subjecting the reaction mixture to a distillation involving the use of relatively high temperatures and greatly reduced pressures.

We are aware that it has been proposed to acylate cashew nut shell liquid, and that it has also been proposed to distil unacylated shell liquid. However, as far as we have been able to ascertain, acylated shell liquid has never, prior to this invention, been distilled under relatively high temperatures and greatly reduced pressures for any purpose, much less to produce a distinctively new and unique class of materials possessing an unusual combination of physical and chemical properties. It is thought, therefore, that the essence of the invention resides in the combined steps of first acylating the shell liquids and then distilling the acylated material under relatively high temperatures and greatly reduced pressures.

The preferred acylating agents are the anhydrides of the lower aliphatic acids containing from two to eight carbon atoms. However, the straight organic acids are capable of bringing about an appreciable but limited degree of acylation, and for reasons of economy we prefer to carry out as much of the acylation as possible by the use of concentrated aliphatic acids and then to complete the acylation by the use of the more powerful and reactive anhydrides. Satisfactory results may be obtained by the use of a mixture of acylating agents containing diverse radicals. As an example may be mentioned an acylating mixture containing the acetyl and propionyl or butryl radicals.

In a preferred procedure, raw or decarboxylated cashew nut shell liquid is mixed with glacial acetic acid, and heated to reflux temperatures. The temperature is maintained at this point for a short while, and then is gradually raised to 300°–350° F. The bulk of the free acetic acid together with some water distils off. To the residue is added a quantity of acetic anhydride, and the mixture is refluxed for a short time. The temperature is again raised to 300°–350° F. and a moderate vacuum is applied. Some glacial acetic and acetic anhydride distil off. This distillate may be used in acylating a subsequent batch of shell liquid.

The residuum of the moderate vacuum distillation may be subjected to an optional partial purification to remove certain insoluble material, which tends to settle out. This insoluble material may be removed by settling followed by decantation, by centrifuging, or by filtration. A small quantity of carbon black may be added, if desired.

The purified or unpurified residuum of the moderate vacuum distillation is now subjected to a rapid high temperature high vacuum distillation. In this latter step, the ratio of distillate to residue is more or less dependent upon the length of time that the reaction mixture is subjected to high temperatures. As a general rule, it may be stated that the more quickly the distillation is completed for a given temperature range the higher the yield of distillate. The vacuum employed should preferably be equivalent to a mercury pressure of 10 mm. or less. A temperature range of from 400° to 700° F. has been found particularly suitable for a rapid distillation. Charring due to localized over-heating may be greatly reduced by employing an efficient stirring mechanism.

The nature of the resulting residue is in large measure dependent upon the period of time that the mixture is heated during the final distillation step as well as upon the point at which the distillation is stopped. If the final distillation is carried out so as to procure a maximum yield of distillate, the residue will be of a pitchy coke-like character. Since it is difficult to remove such a residue, it is sometimes advantageous to cut the distillation short of the maximum potential yield. The residue in such case is fluid at the elevated temperatures and can be readily removed from the distillation apparatus.

From the standpoint of the economics involved in the process of the invention, it may be pointed out that the residue, while having some commercial value, is nevertheless of considerably less importance and value than the distillate. For this reason, we prefer to carry out the process in such a manner as to obtain as large a distillate, and hence as small a residue, as possible. One of the wholly unexpected and highly desirable features of our invention is that in the distillation of acylated shell liquid, we obtain a much higher yield of commercially valuable distillate than can be obtained by the conventional distillation of unacylated shell liquid.

At this point it may be stated that in the conventional distillation of straight cashew nut shell liquid, the yield of distillate, other factors being the same, is greatly influenced by botanical considerations such as the amount of moisture prevailing during the growth of the nut, the exact time that the nuts are picked, etc. In the ordinary process of distillation without a preceding acylation step, the usual yield of distillate runs between 40 and 60% and rarely exceeds the latter figure. By acylating the shell liquid prior to distillation, we have found it possible to raise the yield of distillate very substantially and to diminish the yield of residue to a corresponding degree. In some instances the yield of distillate has been raised as much as 25%. It should be borne in mind that the distilled acylation products are quite different, both physically and chemically, from the unacylated shell liquid, whether distilled or undistilled.

Since the invention is in no way dependent upon the particular type or form of apparatus, it is not considered necessary to describe the apparatus.

A number of examples to illustrate the invention will now be given. For convenience, all of the examples start with cashew nut shell liquid and utilize acylating agents containing the acetyl radical, but it is to be understood that the examples are applicable to the shell liquids of the marking nut and of related species, and that acylating agents containing other acyl radicals may be employed in substantially the same manner. It is to be noted, in this connection, that when using acylating agents having higher molecular weights and boiling points than acetic acid and acetic anhydride, higher temperatures corresponding to the higher boiling points have to be employed.

EXAMPLE I

*Step one*

Cashew nut shell liquid (12 parts by weight) and glacial acetic acid (6 parts by weight) are heated to reflux temperature, and kept at this temperature for about thirty minutes. The temperature is then raised to 300–350° F. As previously stated, the free acetic acid and some water distil off.

*Step two*

There is then added acetic anhydride (2.85 parts by weight), and the mixture is again raised to reflux temperature, and held there for about fifteen minutes. The mixture is then distilled, ending up with a temperature of the liquid of between 300° and 350° F. and a vacuum of between 20 and 26 inches.

*Step three*

The product is now subjected to high temperature high vacuum distillation with rapid stirring. A vacuum corresponding to a pressure of 10 mm. mercury or less is applied, and the temperature is raised as rapidly as is consistent with the structural parameters of the equipment. Usually a maximum temperature of the liquid of about 600° F. is sufficient. The distillation is continued until virtually nothing more distils over.

Generally, about 9 or 10 parts of distillate are obtained, the residue being about 3¼ to 4 parts. The residue is of a pitchy coke-like character, which barely softens in the neighborhood of 600° F., and which is quite brittle at lower temperatures. The distillate is straw to amber in color, and darkens upon exposure to light and air.

EXAMPLE II

This example differs from Example I in that distillation in Step three is discontinued when the weight of the distillate amounts to about 7.7 to 7.9 parts. The residue in this instance is quite fluid and amounts to between 5.3 and 5.6 parts. The residue can readily be removed from the apparatus by allowing it to run out or by siphoning it out. The distillate is straw to amber in color and darkens rapidly upon exposure to light and air.

EXAMPLE III

This example differs from the procedure in Examples I and II simply in that the product of Step two prior to being subjected to the distillation of Step three is filtered in order to remove the substantial amount of insoluble material.

The product of Step two may be centrifuged instead of filtered, or the insoluble material may be decanted.

EXAMPLE IV

This example differs from the procedures in the foregoing examples primarily in that the product of Step two is ozonated prior to the distillation of Step three. The ozonation may be carried out by bubbling oxygen or air containing ozone through the material to be ozonated. The ozonated material has a decided tendency to foam upon heating, and hence the distillation of Step three must be carried out with a greater than usual degree of caution.

EXAMPLE V

The following procedure gives proportions and conditions indicative of operations on pilot plant and commercial scales:

Raw or untreated cashew nut shell liquid (100 parts) is mixed with 50 parts of glacial acetic acid or of "recovered acid" from a prior processing. The mixture is refluxed for about thirty minutes and then distilled until about one part is distilled off. This distillate constitutes the "heads." The distillation is continued until the temperature of the liquid reaches 300° F., at which point 23.8 parts of acetic anhydride are added. The mixture is then refluxed for about fifteen minues, and then distilled with the gradual application of a 26 inch vacuum until the temperature of the liquid attains a temperature of 305° F. This distillate (exclusive of the aforementioned "heads") is mixed with the total distillate from the acetic anhydride step. This mixture of distillates is referred to as the "recovered acid."

The residuum in the kettle is suction filtered while still warm. About 130 parts of this residuum are then subjected to a high temperature distillation. Throughout the distillation the highest possible vacuum is maintained, and the heating is so adjusted that the entire operation is completed within the shortest possible time. The operation is conveniently concluded when 77.5 parts of distillate have been collected. The resultant "de-headed" product constitutes the crude distilled acylation product of the invention, and has an amber color, which gradually darkens on exposure to light and air. The residue (about 50 parts) is a black substance having the consistency of molasses at room temperature. This material is quite fluid at 300° F.

The following table is given to indicate the time, temperatures and pressures encountered in the high temperature high vacuum distillation referred to in Example V:

| Time | Temperature, °F. | | Hg press. | Remarks |
|---|---|---|---|---|
| | Liquid | Vapor | | |
| | Degrees | Degrees | Inches | |
| 2.00 | 86 | 85 | 9/16 | Started heating. |
| 2.10 | 165 | 100 | 7/16 | |
| 2.13 | 235 | 105 | 3/8 | |
| 2.17 | 280 | 105 | 3/8 | |
| 2.21 | 400 | 105 | 3/8 | |
| 2.24 | 440 | 120 | 3/8 | |
| 2.29 | 465 | 160 | 3/8 | |
| 2.31 | 465 | 180 | 3/8 | |
| 2.38 | 470 | 220 | 3/8 | |
| 2.43 | 470 | 240 | 3/8 | |
| 2.49 | 470 | 300 | 3/8 | |
| 2.56 | 480 | 400 | 3/8 | |
| 3.00 | 480 | 435 | 3/8 | |
| 3.06 | 490 | 450 | 3/8 | |
| 3.13 | 495 | 434 | 3/8 | |
| 3.22 | 495 | 415 | 3/8 | Distillation stopped 77.5 lbs. distilled off. |

It will be seen from the foregoing table that the total time from start to finish was one hour twenty-two minutes. The vacuum during the distillation corresponded to a mercury pressure of 3/8 of an inch. The maximum temperature of the liquid was 495° F. and the maximum temperature of the vapor was 450° F.

The distillates in the foregoing examples usually contain between 3% and 10% of uncombined acetic acid. This is of particular significance for the reason that prior to the high temperature high vacuum distillation, the material is substantially free of uncombined acetic acid. Apparently more or less cracking occurs during the final distillation. Most of the free acetic acid and other volatile substances may be readily removed by heating the distillate to a temperature of between 300° and 350° F. while under a vacuum of 15 to 28 inches. The resultant product contains less than a half of one per cent of acid calculated as acetic, and will hereinafter be referred to as "de-acidified distillate."

The distilled acylated shell liquids vary from a light straw to a deep amber color, which darkens more or less rapidly when permitted to stand exposed to light and air. A lighter product substantially devoid of darkening tendencies may be produced by refining the distilled acylated shell liquid. This may be accomplished in various ways. One effective way is to treat the distillate with an oxidizing or ozonizing agent, and then to redistil. The distillation may be conducted in the absence or presence of slightly alkaline materials such as lime, calcium hydroxide or calcium carbonate. The color of the distilled acylated shell liquid may also be improved to a considerable extent by washing in the presence or absence of oxidizing agents, or by treatment with suitable decolorizing carbons.

The following examples are given to illustrate practical methods of refining the distilled acylated shell liquids:

EXAMPLE I

The de-acidified distillate (deheaded) (7 pounds) is mixed with a 30% hydrogen peroxide solution (35 milliliters) and with manganese drier solution (6% Mn) (25 milliliters). The mixture is heated to the reflux temperature (about 280° F.) and refluxed for 15 minutes. It is then cooled down to about 250° F. A further quantity of hydrogen peroxide (35 milliliters) is added, and the mixture is again heated and refluxed for 15 minutes. It is then cooled down to about 180° F. A good grade of decolorizing carbon (½% on the weight of the de-acidified distillate) is added and the temperature is maintained at 180° F. while the mixture is stirred constantly. The material is finally filtered to obtain a product which may be heated to 300° F. under a 20 inch vacuum without having any substantial quantity distil over. The product is then subjected to redistillation.

For the purpose of redistillation, the above product is mixed with acetic anhydride in the proportion of 145 pounds of product to 1.6 liters of anhydride. The mixture is heated and refluxed for about 15 minutes at atmospheric pressure. Vacuum is applied gradually and the temperature is stepped up. The first portion that distils over is referred to as the "heads," and usually amounts to between 10 and 12 pounds. This is followed by the bulk of the material amounting to about 120 pounds, leaving a tarry residue. The main product is a straw-colored liquid, which retains this light color upon prolonged exposure to light and air. Exposure to ultra violet light does not materially change the color.

EXAMPLE II

To 132 ounces of crude distilled acylation product are added 41.25 milliliters of a 30% aqueous solution of hydrogen peroxide together with 24.75 milliliters of a manganese naphthenate solution (6% Mn). The mixture is heated to 276° F. in 30 minutes, then refluxed for 15 minutes and cooled to 240° F. There are then added 41.25 milliliters of aqueous hydrogen peroxide; the mixture is again heated and refluxed for 15 minutes. The mixture is cooled to 180° F., and 0.66 of an ounce of a good grade of decolorizing carbon is added. The mixture is kept at 180° F. for about an hour while it is constantly agitated, cooled to room temperature, and then suction filtered. The filtrate amounts to about 8.14 pounds.

The filtrate is transferred to a kettle, and heat and a vacuum of 26 inches are gradually applied. The temperature is held at about 300° F. for about 15 minutes. About 1½ ounces of distillate are obtained. The residuum, which amounts to about 7.87 pounds, is then subjected to a high temperature high vacuum distillation in the presence of acetic anhydride (.4 of an ounce of anhydride per 146 ounces of residuum). The "heads" amounting to between 1 and 1.2 ounces per 15 ounces of total charge are distilled off and finally the bulk of the material is distilled off, the "heads" and the bulk being kept apart.

As in the preceding example, the refined product is of a straw to light amber color, and retains its color quite well, even upon prolonged exposure to light and air. The color of the distilled acylation product can be improved in other ways than by redistillation. One way consists in treating the cashew nut shell liquid prior to acylation with neutral, alkaline, or acidic washes and/or oxidizing agents such as ozone and hydrogen peroxide, preferably in the presence of catalysts such as those usually employed as driers. The washing of the cashew nut shell liquid can be considerably facilitated if the water is more or less saturated with salt. The cashew nut shell liquid can be separated from the aqueous solution by decantation or centrifuging. A variation consists in first acylating the shell liquid, and then treating the acylated product in the foregoing manner, i. e. with neutral, alkaline or acid washes, and/or with oxidizing agents. Neutral or acidic washes are preferable to alkaline washes. As a general practice, it has been found preferable to carry out the refining operation after the distillation step. Where the distillation products of the acylated shell liquids are subjected to further processing with reactive reagents, it is often best to carry out the refining or decolorizing operation upon the resultant reaction product.

Still another way to improve the color of the distilled acylated shell liquid is to hydrogenate the product. The hydrogenated material is lighter in color and retains its color for a longer time than the unrefined acylated material, and may be used for the same purposes as the unhydrogenated material.

The distillation products of acylated shell liquids constitute complex mixtures of variable composition. The precise composition is influenced by botanical considerations such as the amount of moisture prevailing during the growth of the nut, the exact time that the nuts are picked, the aging, the manner in which the oil is extracted from the nuts, the degree of acylation, the time, temperature, vacuum and rapidity with which the final distillation is carried out, as well as the precise point at which the distillation is stopped.

Attention has already been called to the fact that upon the completion of the acylation step and prior to the high temperature-high vacuum distillation, the material is substantially free of uncombined acetic acid. On the other hand, during the high temperature distillation free acetic acid and perhaps anhydride are engendered, as is determined by the fact that the distillate contains very appreciable quantities of free acetic acid. Thus we have in the system appreciable quantities of free acetic acid, and perhaps anhydride, at a time when we have temperatures of from 400 to 500° F. These facts are significant when it is considered that in view of the unsaturated character of cashew nut shell liquid, there is present the possibility of the unsaturated linkage taking part in an acylation reaction. It therefore follows that there may be present in the distillate materials wherein the phenolic OH groups are acylated, materials wherein the unsaturated linkages are acylated, material wherein both the unsaturated linkages and the phenolic hydroxy groups are acylated, as well as material unacylated.

The high temperature distillation is accompanied by a certain amount of cracking so that in a measure the operation is akin to that of destructive distillation. At high temperature and atmospheric pressure the distillation products of cashew nut shell liquid are of a different nature and possessed of a lower mean molecular weight than are the products that are procured under the conditions of greatly reduced pressure. Likewise, the amount of cracking and other reactions that may occur are influenced by other materials which may be present either in the free state or more or less chemically tied up with the shell liquids. In this manner the presence of the acyl groups in the molecular complex exerts an appreciable influence upon the course of the distillation. There is definite evidence that the acylation minimizes polymerization, condensation and cracking as is indicated by the fact that the residues obtained are small. Academically, various other reaction possibilities are present.

We have found that despite the complex and variable chemical composition of the distillation products of the shell liquids, the chemical and physical characteristics remain remarkably uniform from run to run when carried out after a specific manner with a given batch of raw material. Generally, the distillation products of acylated shell liquid, when derived after the manner outlined and utilizing cashew nut shell liquid and the acetyl radical, are possessed of physical and chemical constants that lie within the following ranges:

| | |
|---|---|
| Specific gravity | 0.932–0.945 |
| Molecular weight by cryoscopic method | 310–330 |
| Iodine number | 180–195 |
| Saponification value (mg. KOH equivalent per gram) | 80–120 |
| Boiling range of the principal fraction | 400–450° F. at 10 mm. Hg pressure |

The materials are miscible with most organic solvents but are substantially insoluble in water. Their color varies between light straw and deep amber. The products are toxic in that they give rise to dermatities in people allergic to the same. However, the materials may be desensitized in the usual manner.

When utilizing acylating agents other than those containing the acetyl radical or when using the shell liquid of the marking nut or other related botanical species, the physical and chemical constants naturally deviate somewhat from those just listed for the distilled acetylated cashew nut shell liquid.

As has been stated, the products of our invention constitute a distinctively new and unique class of materials possessing many desirable chemical and physical properties that render them eminently suitable for a large number of industrial applications. It should be pointed out that the "distillation" step is just as important as the "acylation" step, and that it is only through the combination of these two steps in the sequence employed, that is, acylation followed by distillation, that we procure the unique and very useful products of the present invention.

The distillation products of acylated shell liquids may be hydrogenated, oxidized, chlorinated, condensed, polymerized and otherwise reacted with a host of reactive reagents.

The products of our invention may in many instances be utilized in substantially the same manner and for the same purposes for which the various other shell liquid derivatives have been employed. In most cases where the distilled acylated shell liquids can be used instead of the other derivatives, greatly improved results are obtained with the distilled acylation products. However, it is to be particularly noted that the distilled acylated shell liquids can not always be substituted for the other derivatives and vice versa. For, as has been pointed out, the distilled acylated shell liquids have unique and distinctive physical and chemical properties, which enable them to be used to obtain results and procure products which have not hitherto been obtained with the previously known derivatives of the shell liquids.

The distillation products of acylated shell liquids are suitable as plasticizers in various commercial products such as coating compositions, molding resins, and rubbery products. These materials are also suitable for impregnating porous products such as paper, fabric, wood, etc. They are also useful as an ingredient in insecticidal, germicidal, and fungicidal compositions. In addition, these materials as such or after suitable processing, are of particular value in making automobile cleaners and polishes, waterproof sandpaper and cloth, typewriter stencil sheets, coatings for carbon paper to prevent smudging, paint and varnish removers, abrasive wheels, friction elements such as brake blocks and linings, Scotch tape and insulating tape. Emulsifying and suspending aids may also be made from the distilled acylated shell liquids.

The distilled acylated shell liquids are also highly useful intermediaries in the manufacture of coupling agents, resins, resin modifiers, rubber modifiers, synthetic drying oils, synthetic high temperature baking varnishes, etc.

In conclusion, it is to be noted that the residues obtained in producing the distilled acylated shell liquids of the present invention constitute a by-product of considerable importance. This by-product can be converted by means of heat into an infusible material, which can be comminuted and made into brake blocks, etc., having high coefficients of friction and excellent wearing qualities. The residues can also be reacted with aldehydes or hexamethylenetetramine and its addition products to yield resinous materials, particularly suitable for the manufacture of friction materials or as fillers in molding compositions.

We claim:

1. The process which consists in refluxing cashew nut shell liquid with glacial acetic acid, refluxing the residuum with acetic anhydride, and finally subjecting the residuum to a distillation under relatively high temperatures and greatly reduced pressures.

2. As a composition of matter, the product obtained by refluxing cashew nut shell liquid with glacial acetic acid, refluxing the residuum with acetic anhydride, and finally subjecting the residuum to a distillation under relatively high temperatures and greatly reduced pressures.

3. The process which consists in refluxing cashew nut shell liquid with glacial acetic acid, refluxing the residuum with acetic anhydride, and finally subjecting the residuum to a distillation at a temperature in the order of 400° F. and under a vacuum equivalent to a mercury pressure in the order of 10 mm.

4. As a composition of matter, the product obtained by refluxing cashew nut shell liquid with glacial acetic acid, refluxing the residuum with acetic anhydride, and finally subjecting the residuum to a distillation at a temperature in the order of 400° F. and under a vacuum equivalent to a mercury pressure in the order of 10 mm.

EMIL E. NOVOTNY.
GEORGE K. VOGELSANG.